(12) United States Patent
Gu et al.

(10) Patent No.: US 7,767,257 B2
(45) Date of Patent: Aug. 3, 2010

(54) METHOD FOR PREPARING A POROUS INORGANIC COATING ON A POROUS SUPPORT USING CERTAIN PORE FORMERS

(75) Inventors: Yunfeng Gu, Painted Post, NY (US); Wei Liu, Painted Post, NY (US); Todd P St Clair, Painted Post, NY (US); Jianguo Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 390 days.

(21) Appl. No.: 11/880,073

(22) Filed: Jul. 19, 2007

(65) Prior Publication Data

US 2008/0299377 A1 Dec. 4, 2008

Related U.S. Application Data

(60) Provisional application No. 60/932,462, filed on May 31, 2007.

(51) Int. Cl.
*B32B 5/18* (2006.01)
*B05D 7/22* (2006.01)

(52) U.S. Cl. .................... 427/181; 428/316.6; 428/116; 427/215; 427/220; 427/222; 427/226

(58) Field of Classification Search ........................ None
See application file for complete search history.

(56) References Cited

U.S. PATENT DOCUMENTS

| | | | |
|---|---|---|---|
| 4,711,719 A | 12/1987 | Leenaars et al. | 210/500.26 |
| 4,724,078 A | 2/1988 | Auriol et al. | 39/20 |
| 4,971,696 A | 11/1990 | Abe et al. | 210/500.25 |
| 4,980,062 A | 12/1990 | Block | |
| 5,120,576 A | 6/1992 | Goldsmith et al. | 427/245 |
| 5,415,775 A | 5/1995 | Castillon et al. | 210/490 |
| 7,049,259 B1 | 5/2006 | Deckman et al. | 502/4 |
| 2005/0046063 A1 | 3/2005 | Toda et al. | |
| 2006/0228521 A1 | 10/2006 | Ohno et al. | 428/117 |

FOREIGN PATENT DOCUMENTS

| | | | |
|---|---|---|---|
| EP | 0344961 | 1/1993 | 69/12 |
| EP | 0 732 139 A2 | 9/1996 | |
| WO | 85/01937 | 10/1983 | |
| WO | 2006/130759 A2 | 12/2006 | |

OTHER PUBLICATIONS

B.C. Bonekamp, "Preparation Of Asymmetric Ceramic Membrane Supports By Dip-Coating", Fundamentals of Inorganic Membrane Science and Technology, Chapter 6, pp. 141 and 213 (1996).

(Continued)

*Primary Examiner*—Ling Xu
(74) *Attorney, Agent, or Firm*—Steven J. Scott; Lisa M. Noni

(57) ABSTRACT

Methods for preparing porous inorganic coatings on porous supports using certain pore formers, and porous supports coated with porous inorganic coatings. The porous inorganic coatings may serve as membranes useful in, for example, liquid-liquid, liquid-particulate, gas-gas, or gas-particulate separation applications.

26 Claims, 7 Drawing Sheets

OTHER PUBLICATIONS

B.C. Bonekamp, "Preparation Of Asymmetric Ceramic Membrane Supports By Dip-Coating", Fundamentals of Inorganic Membrane Science and Technology, Chapter 6, pp. 141 and 157 (1996).

B.J. Briscoe et al., "Optimising The Dispersion On An Alumina Suspension Using Commercial Polyvalent Electrolyte Dispersants", Journal of the European Ceramic Society, vol. 18, pp. 2141-2147 (1998).

Bhattacharjee et al., "Effect of additives on the microstructure of porous alumina", Journal of the European Ceramic Society, vol. 27, 2007, pp. 47-52.

w/o milk w/ milk w/o milk w/ milk

METHOD FOR PREPARING A POROUS INORGANIC COATING ON A POROUS SUPPORT USING CERTAIN PORE FORMERS

This application claims the benefit of priority to provisional application No. 60/932,462, titled "Method for Preparing a Porous Inorganic Coating on a Porous Support Using Certain Pore Formers," filed on May 31, 2007, the contents of which are incorporated by reference herein.

FIELD OF THE INVENTION

The invention relates to methods for preparing porous inorganic coatings on porous supports using certain pore formers, and to porous supports coated with porous inorganic coatings. The porous inorganic coatings may serve as membranes useful in, for example, liquid-liquid, liquid-particulate, gas-gas, or gas-particulate separation applications.

BACKGROUND

An inorganic membrane may be applied, for example, as a porous coating on a porous ceramic support. Inorganic membranes offer several advantages over organic membranes. Inorganic membranes, for example, typically have high chemical and thermal stabilities that allow the membranes to be used in extreme pH and chemical environments. In addition, inorganic membranes can be easily cleaned by applying high temperature treatments such as firing.

Inorganic membranes may be used for filtration and separation applications in the environmental, biological, food and drink, semiconductor, chemical, petrochemical, gas and energy industries. These industries often require purified gas/vapor or purified liquid whose source is a mixed feed stream composed of different gas and/or liquid/particulate combinations. Specific examples include purification and separation of hydrogen gas, sequestration of carbon dioxide gas, filtration of oil/water mixtures, wastewater treatment, filtration of wines and juices, filtration of bacteria and viruses from fluid streams, separation of ethanol from biomass, and production of high purity gas and water for the semiconductor and microelectronics industry.

Inorganic membranes may be applied as layered structures comprising a porous inorganic monolayer or multilayer coating on a porous support, such as a ceramic support. The porous coating layer is generally prepared by dipping the support into a coating slip and by subsequently withdrawing it out of that slip, followed by drying and firing.

The coating slip is a dispersion of solid particles in a liquid. Fine particles that are in the colloidal range ($\leqq 1$ um) usually aggregate in the dispersing medium due to relatively high strength of the inter-particle van der Waals attractive forces. Thus, a dispersant such as Darvan C, Tiron or Aluminon is often introduced to build up a repulsive force barrier and to stabilize the slips (Briscoe, Khan, Luckham, J. Europ. Ceram. Soc., 18 (1998) 2141-2147). Also, coating slips generally contain more than one polymeric compound, such as surfactants, lubricants, and plasticizers. The interaction between all these compounds determines the slip behavior and the microstructure development during compaction, drying and calcining (Burggraaf and Cot, Fundamentals of Inorganic Membrane Science and Technology, Elsevier Science B.V., 1996, Page 157).

WO 85/01937 discusses a process to make adherent Microfiltration coatings on the inside of macroporous tubes by filling and draining a tube with a de-agglomerated alumina slip and subsequent drying and firing of the coating. Besides 8 wt. % alumina powder, the slip contained polyethylene glycol (PEG) and Darvan C dispersant by 0.2%. The slip was ball-milled for 24 h, which was believed to be essential for breaking up the agglomerates and dispersing the particles well.

EP 0344961 B1 discusses another formulation of an inorganic coating slip used for coating on a porous metal. The slip comprises 60-95% by weight of relatively larger inorganic particles such as alumina and zirconia, the balance being of much smaller particles. The larger particles may have an average in the range of 0.5-50 um, chosen to generate membranes with pores of desired size. The smaller particles may have an average size of 4 nm up to 1 um, but not more than 0.1 times the size of the larger particles. The smaller particles act as a sintering aid, enabling the membrane to be sintered at lower temperatures. The portions of the smaller particles should not be too large to substantially block the pores between the larger particles.

Inorganic membrane coatings furthermore often encounter problems of mud cracking, de-lamination, and pore closure. Some anti cracking organic materials, such as, PEG, PVP, PVA, etc, are often used in the coating slip. However, in many cases, those additives are not effective. Another problem encountered with inorganic membrane coating relates to pore structure. For high flux, uniform pore structures and large porosity is desired. However, in conventional coating processes, pore structures are generally formed from particle packing during drying and firing process, thus limiting porosity.

In view of the above, there is a need in the art for more favorable processes for depositing porous membranes of inorganic particles on porous supports.

SUMMARY OF THE INVENTION

The invention relates to methods for preparing porous inorganic coatings on porous supports using certain pore formers (i.e., pore formers added with the inorganic particles forming the coating), and to porous supports coated with porous inorganic coatings. A method of the invention comprises:

providing a porous support comprising a first end, a second end, and a plurality of inner channels having surfaces defined by porous walls and extending through the support from the first end to the second end;

applying to the inner channel surfaces of the support a coating comprising inorganic particles and an organic pore-forming material selected from protein particles, starch particles, synthetic polymer particles, and combinations thereof; and heating the coated support to remove the organic pore-forming material, leaving a porous inorganic coating on the porous support.

One example pore-forming material is protein applied to the support from a composition comprising skim milk.

This and additional features provided by embodiments of the present invention will be more fully discussed in the following detailed description.

BRIEF DESCRIPTION OF THE DRAWINGS

FIG. 2a illustrates the surface morphology of the bare support, FIG. 2b illustrates the surface morphology of the pre-coat formed on the support, and FIG. 2c provides a cross-sectional view of the pre-coated support.

Figure 1:
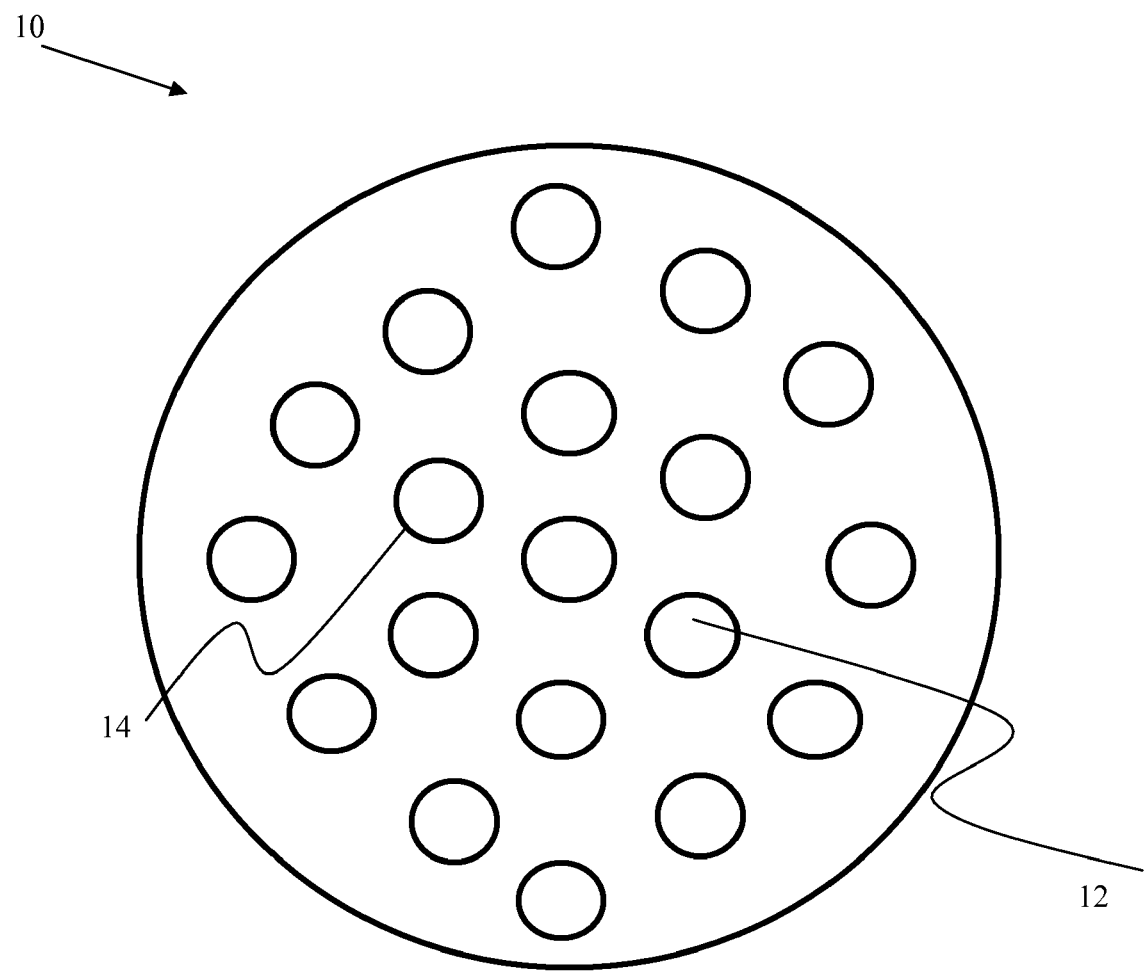
FIG. 1 is a schematic of a multi-channel porous support useful in an embodiment of the invention.

The embodiments set forth in the figures are illustrative in nature and not intended to be limiting of the invention defined by the claims. Moreover, individual features of the drawings and the invention will be more fully discussed in view of the detailed description.

DETAILED DESCRIPTION OF THE INVENTION

An embodiment of the invention is a method for preparing a porous inorganic coating on a porous support, which comprises:

providing a porous support comprising a first end, a second end, and a plurality of inner channels having surfaces defined by porous walls and extending through the support from the first end to the second end;

applying to the inner channel surfaces of the support a coating comprising inorganic particles and an organic pore-forming material selected from protein particles, starch particles, synthetic polymer particles, and combinations thereof; and heating the coated support to remove the organic pore-forming material, leaving a porous inorganic coating on the porous support.

The porous support used in the invention may be in the form of, for example, a honeycomb monolith. The method of the invention works advantageously well in depositing membranes within honeycomb channels of small diameter. The porous support, such as a honeycomb monolith, could have a channel density of, for example, from 50 to 600 cells per square inch. Example honeycomb monolith supports are disclosed in U.S. Pat. Nos. 3,885,977 and 3,790,654, the contents of both being incorporated by reference herein.

To allow for more intimate contact between a fluid stream flowing through the support and the coated support itself, for example when used in a separation application, it is desired in certain embodiments that at least some of the channels are plugged at one end of the support, while other channels are plugged at the other end of the support. In certain embodiments, it is desired that at each end of the support, the plugged and/or unplugged channels form a checkerboard pattern with each other. In certain embodiments, it is desired that where one channel is plugged on one end (referred to as "the reference end") but not the opposite end of the support, at least some, for example a majority, of the channels (preferably all of the channels in certain other embodiments) immediately proximate thereto (those sharing at least one wall with the channel of concern) are plugged at such opposite end of the support but not on the reference end. Furthermore, individual supports such as honeycombs can be stacked or housed in various manners to form larger supports having various sizes, service duration, and the like, to meet the needs of differing use conditions.

In one embodiment, the support is an inorganic material. Suitable porous inorganic support materials include ceramic, glass ceramic, glass, metal, clays, and combinations thereof. Some example materials include cordierite, mullite, clay, magnesia, metal oxides, talc, zircon, zirconia, zirconates, zirconia-spinel, magnesium alumino-silicates, spinel, alumina, silica, silicates, borides, alumino-silicates, e.g., porcelains, lithium aluminosilicates, alumina silica, feldspar, titania, fused silica, nitrides, borides, carbides, e.g., silicon carbide, silicon nitride or combinations of these.

In view of the above, the porous inorganic support could be a ceramic, such as cordierite, alumina (such as alpha-alumina), mullite, aluminum titinate, titania, zirconia, ceria or combinations thereof.

In one embodiment, the porous support is an alpha-alumina support as disclosed in co-pending U.S. Application No. 60/874,070, filed on Dec. 11, 2006, and titled "Alpha-Alumina Inorganic Membrane Support and Method of Making the Same," the contents of which are incorporated by reference herein. The support can be made, for example, according to a process comprising:

combining 60 weight % to 70 weight % α-alumina comprising a particle size in the range of 5 µm to 30 µm, 30 weight % of an organic pore former comprising a particle size in the range of 7 µm to 45 µm, 10 weight % of a sintering aid, and other batch components such as crosslinker, etc., to form a batch;

mixing the batch and allowing it to soak for 8 hours to 16 hours;

shaping a green body by extrusion; and sintering the green body by heating the green body at a temperature of at least 1500° C. for 8 hours to 16 hours.

In another embodiment, the support can comprise an organic material, such as a phenolic resin. In any event, the support structure should have adequate thermal stability so that it maintains a useful shape upon application of heat when carrying out the methods of the invention.

The porous support "provided" according to the invention may be a unitary structure, such as a bare ceramic support. In that instance, the inner channels of the support have surfaces defined by porous walls of the unitary porous ceramic support.

In another embodiment, the porous support "provided" according to the invention may comprise a unitary structure, such as a ceramic support, already coated with a porous material that forms the porous walls of the inner channels of the support. That pre-existing coating may be, for example, one or more coatings of inorganic particles, such as alpha-alumina particles. In that instance, the inner channels of the provided support have surfaces defined by the porous coating of inorganic particles. Thus, in that embodiment, the method of the invention is carried out beginning with a coated support and results in the deposition of a further coating of inorganic particles placed over the previous coating. That embodiment may be carried out, for example, to ultimately deposit a coating of inorganic particles of a smaller median diameter over a pre-existing coating of inorganic particles having a larger median diameter.

In one embodiment, the porous support "provided" according to the invention comprises a ceramic already pre-coated with a porous membrane of inorganic particles that forms the porous walls of the inner channels of the support. The pre-coat may be in the form of one or several layers. The pre-coat itself can be applied by any method, including a method of the invention having been performed on a bare ceramic support.

The pre-coat itself discussed above can also be applied using techniques disclosed in a commonly owned and co-pending application filed the same day as the present application and titled "Method for Preparing a Porous Inorganic Coating on a Porous Support Using Certain Pore Fillers," the contents of which are incorporated by reference herein. More specifically, the pre-coat can be applied according to a method that comprises:

providing a porous support comprising a first end, a second end, and a plurality of inner channels having surfaces defined by porous walls and extending through the support from the first end to the second end;

modifying the inner channel surfaces of the support by applying to the inner channel surfaces a composition comprising an organic pore-filling material selected from protein particles, starch particles, synthetic polymer particles, and combinations thereof;

applying to the modified inner channel surfaces a coating comprising inorganic particles; and heating the coated support to remove the organic pore-filling material, leaving a porous inorganic coating on the porous support.

The method of the present invention may then be used to apply a further coating on such a pre-coated support.

In yet a further embodiment, the porous support "provided" according to the invention comprises a ceramic having inner channel surfaces that have been modified by application of a composition comprising an organic pore-filling material selected from protein particles, starch particles, synthetic polymer particles, and combinations thereof. Such a composition may be skim milk used to supply the protein particles. The method of the invention could then carried out on such a modified support that, for example, has been dried after application of the pore-filling material. Thus, in combination with the modification step, the method would comprise:

providing a porous support comprising a first end, a second end, and a plurality of inner channels having surfaces defined by porous walls and extending through the support from the first end to the second end;

modifying the inner channel surfaces of the support by applying to the inner channel surfaces a composition comprising an organic pore-filling material selected from protein particles, starch particles, synthetic polymer particles, and combinations thereof;

applying to the modified inner channel surfaces of the support a coating comprising inorganic particles and an organic pore-forming material selected from protein particles, starch particles, synthetic polymer particles, and combinations thereof; and heating the coated support to remove the organic pore-forming material and pore-filling material, leaving a porous inorganic coating on the porous support.

Referring to FIG. 1, an exemplary multi-channel porous support 10 is illustrated. In this embodiment, the porous support 10 is a multi-channel structure, in particular a cylindrical structure (length not illustrated), comprising a plurality of inner channels 12 defined by porous walls 14 throughout its cross-section. In this and other embodiments, the inner channels of the support can be circular and have an average diameter of, for instance, from 0.5 to 10 mm, for example from 0.5 to 2 mm. The length of the support may be selected in view of its particular application. For example, the support may have a length of 80 mm or more, for example 100 mm, 150 mm or 200 mm or more. On a larger scale, the support may have a length of 0.5 m or more, or 1.0 m or more.

The invention can be applied to supports having a wide range of porosities and pore sizes on the porous walls that define the inner channel surfaces of the provided support. In one embodiment, the pores of the porous walls of the provided support have a median pore size of from 0.5 to 100 µm, for example from 0.5 to 10 µm.

A coating comprising inorganic particles and an organic pore-forming material selected from protein particles, starch particles, synthetic polymer particles, and combinations thereof, is applied to the inner channel surfaces of the support. The porosity and pore-sizes of the inorganic porous coatings ultimately made according to the invention are influenced by the addition of the organic pore-formers at this stage.

In one embodiment, the organic pore-forming material comprises protein particles. Protein particles may be supplied, for example, by contacting the inner channel surfaces of the support with a composition comprising an aqueous suspension of protein particles. One example of an aqueous suspension of protein particles is skim milk. In another embodiment, the organic pore-filling material comprises starch particles, such as amaranth starch (for example, having a mean diameter of 1.5 µm), quinoa starch (for example, having a mean diameter of 1.8 µm), taro starch (for example, having a mean diameter of 2.8 µm), or combinations thereof. In yet another embodiment, the organic pore-forming material comprises synthetic polymer particles, such as polystyrene, polyacrylate, an oligomer, or combinations thereof. Example oligomers include polyolefins having a molecular weight of 5000 daltons or less.

The particle size of the organic pore-forming material can be selected depending on the characteristics of the support, such as its pore size or pore size distribution, and on the characteristics of the inorganic particles that will be subsequently applied, such as their particle size. For example, the organic pore-forming material may comprise particles having a median particle size of from 0.02 to 3 µm.

The particle size distribution of the pore-forming material may also be selected depending on the desired characteristics of the resulting coating. In one embodiment, the particle size distribution of the pore-forming material, as measured by dynamic light scattering, meets the condition $(d90-d10)/d50 \leq 2$, for example $\leq 1.6$, $\leq 1.5$, $\leq 1.2$ or $\leq 1.1$, where particles having a size of d90 or less, d50 or less, and d10 or less account for 90%, 50%, and 10% of the of the total light intensity, respectively. In another embodiment, the pore-forming material comprises protein particles that meet the condition $(d90-d10)/d50 \leq 1.6$. In another embodiment, the pore-forming material comprises starch particles that meet the condition $(d90-d10)/d50 \leqq 1.1$.

A wide variety of inorganic particles may be used in the coating of the invention, including but not limited to cordierite, alumina (such as alpha-alumina and gamma-alumina), mullite, aluminum titinate, titania, zirconia, and ceria particles and combinations thereof. The size of the inorganic particles may be selected depending, for example, on the pore size of the underlying modified support. For instance, the inorganic particles may have a median particle size of from 0.02 to 10 μm.

The coating comprising inorganic particles and the organic pore-forming material may be applied, for example, by contacting the provided support with a composition comprising them. The coating composition may comprise, for instance, from 0.1 to 50 wt. % of inorganic particles. Generally speaking, higher inorganic particle concentrations tend to produce a thicker, more viscous slip, which in turn tends to produce a thicker coating on the support. The coating composition may also comprise, for example, a dispersant, a binder, an anti-cracking agent, an anti-foam agent, or combinations thereof, and may comprise an aqueous or organic carrier and be in the form of a slurry or suspension.

The coating comprising inorganic particles and the organic pore-forming material may be applied to the inner channel surfaces of the support through various methods, for example, by dip coating, flow coating, slip-casting, immersion, or combinations thereof. Using these methods, membrane materials are transported from a fluid medium onto the channel walls and deposited on the wall surfaces, leaving an intact deposition layer after the fluid is discharged.

Figure 14:
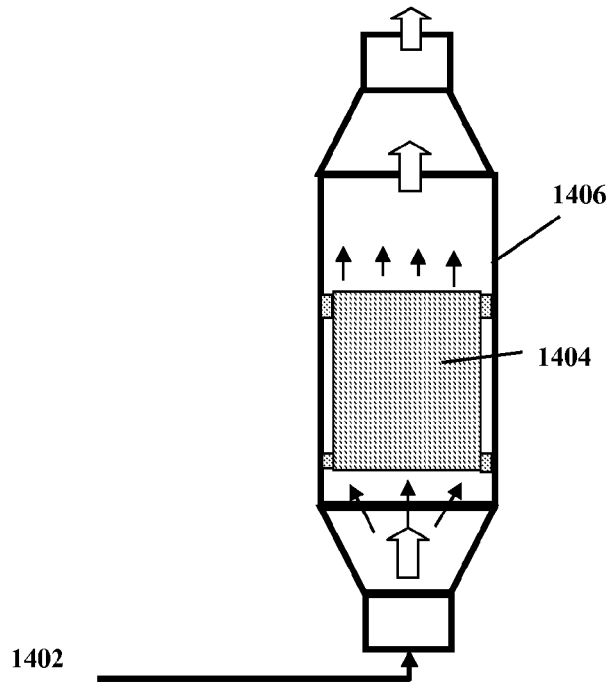
FIG. 14 is a schematic of a flow coating process and apparatus useful in an embodiment of the invention.

In one embodiment, the coating is deposited as a coating slip on the porous support while the provided support is mounted inside a flow coater illustrated in FIG. 14, as discussed in co-pending U.S. application Ser. No. 11/729,732, filed on Mar. 29, 2007, and titled "Method and Apparatus for Membrane Deposition," the contents of which are incorporated by reference herein. This technique includes providing a liquid precursor comprising membrane-forming materials to the support and applying a pressure differential across the support. The pressure differential causes the liquid precursor to travel uniformly through the channels, depositing the membrane-forming materials on the walls of the channels and forming the membrane on the walls of the through-channels. An apparatus useful for those techniques, illustrated in FIG. 14, includes an inlet that uniformly distributes a liquid precursor coating solution 1402 to a monolith support 1404, such as a monolith honeycomb structure, a chamber 1406 capable of holding the support and maintaining a pressure differential across the plurality of through-channels, and an outlet.

The thickness, texture, and uniformity of the deposited membrane films may be controlled by process conditions. It will be apparent that the process conditions that are actually employed in the deposition of such membrane films depend on the nature of the membrane film and the liquid precursor, as well as other variables. For example, the linear velocity of the liquid precursor through the plurality of through-channels affects the hydrodynamics and mass transport of the liquid precursor onto the walls of the plurality of through-channels. In one embodiment, the liquid precursor flows through the plurality of through-channels at a predetermined linear velocity.

The resulting coated support may then be dried under a variety of conditions. For example, the coated support may be dried for 15-25 hours at room temperature or higher up to 120° C. in an air or nitrogen atmosphere. Drying may also be conducted under conditions of 60-90% humidity. The drying step, in one embodiment, is carried out in a controlled gas environment. The controlled gas environment is one in which the content of at least one of oxygen and water content is controlled. The oxygen content of the controlled atmosphere is typically kept to a minimum.

The coated support is then heated, for example fired, to remove the organic pore-forming material, leaving a porous inorganic coating on the underlying porous support. During the same or different heating step, the inorganic particles in the porous inorganic coating can be sintered. In one embodiment, the support may be fired at 900° C. to 1500° C. for a period of from 0.5 to 10 hours in a controlled gas environment at a heating rate of, for example, 0.5-2° C./min. In another embodiment, the firing process can be executed for 20-45 hours at 1100-1300° C. in air or in a mixture of nitrogen and oxygen. In yet another embodiment, the coated support is heated to calcinate the organic pore-forming material, for example at a temperature of 600° C. or more, then fired at a higher temperature to achieve sintering of the inorganic particles.

In one embodiment, the resulting sintered porous inorganic coating has a thickness of from 0.2 to 25 μm throughout the length of the inner channels, which could be throughout a length of 80 mm or more. The thickness of the coating can be increased by simply repeating the application of the same size particles in additional coating steps.

The pore size of the inorganic coating can be selected through appropriate choice of, for example, the inorganic particle size, the type and size of pore-forming material, and sintering conditions. In one embodiment, the sintered inorganic coating has a median pore size of from 0.01 to 2 μm.

A further embodiment of the invention is a porous inorganic coating on a porous ceramic support, which is made by the method of the invention. Yet another embodiment is a coated porous support, which comprises:

a porous support comprising a first end, a second end, and a plurality of inner channels that have surfaces defined by an outer porous coating of inorganic particles and that extend through the support from the first end to the second end;

wherein the porosity of the outer coating of inorganic particles, measured by mercury porosimetry, is 40% or higher, for example 50% or higher; and wherein the pore size distribution of the outer porous coating of inorganic particles, measured by mercury porosimetry, meets the condition $(d90-d10)/d50 \leqq 2$, for example $\leqq 1.5$, $\leqq 1.2$, or $\leqq 1.0$, where pores having a size of d90 or less, d50 or less, and d10 or less account for 90%, 50%, and 10% of the of the total pore volume, respectively.

In embodiments of the coated support described above, the coated support exhibits a steady state pure water permeance of 2500 L/m²/bar or more at 22° C., for example 4000 L/m²/h/bar or more or 5000 L/m²/h/bar or more.

The coatings on the supports may be used as inorganic membranes suitable for liquid filtration and gas separation applications. The separations could be achieved by passing the liquid or gas stream through the channels of the coated support to effect the desired separation. The coatings can also be applicable to automotive catalytic products and diesel particulate filter products.

For membrane filtration or separation applications, the methods described herein can provide direct deposition of coatings with small pores on a porous support with large pores, while reducing coating thickness, and thereby reducing costs and enhancing the permeation flux. For catalytic applications, the methods described herein can enable deposition of a uniform, thin layer catalyst on a porous support and minimize penetration of the catalyst material into the support pores, thereby resulting in better catalyst utilization, significant cost saving in the precious metal catalyst as well as reduced heating costs. The coated supports may furthermore be used as intermediate structures in processes that deposit additional membranes on the coated supports. Accordingly, it will be understood that the methods described herein can be used to manufacture membranes for use in a variety of applications.

EXAMPLE 1

Application of Pre-coat to Alpha Alumina Monolith Support

Membrane coating experiments in this example are discussed with respect to a porous alpha alumina monolith support. The bare monolith support is made of alpha-alumina with an outer diameter of 8.7-10.0 mm and a length of 80-150 mm and comprising 19 rounded channels of average diameter of 0.75 mm uniformly distributed over the cross-sectional area. The median pore size of the bare support is 8.4-8.7 µm and porosity is 43.5-50.8% as measured by Hg porosimetry.

Figures 2A, 2B, 2C:
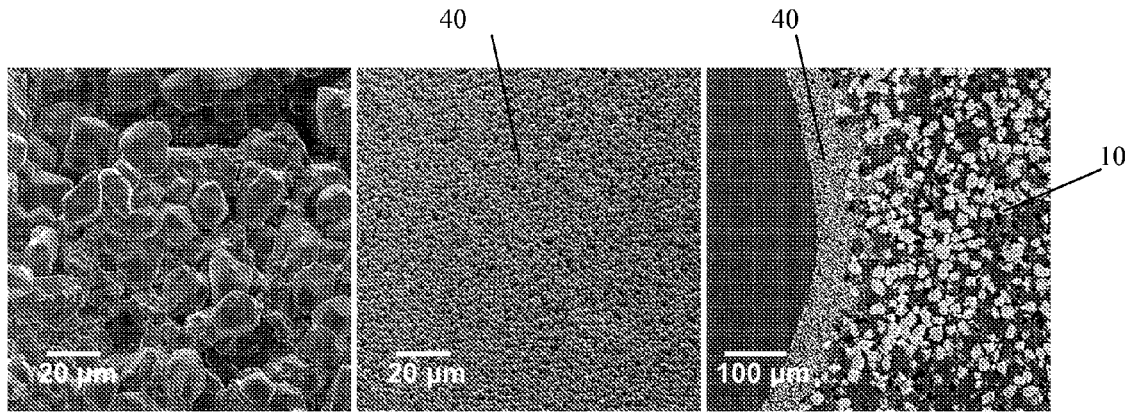
FIGS. 2a-2c are scanning electron microscope (SEM) images of a bare support and the pre-coated support, where

A pre-coating of inorganic particles was first applied to the support. The support was flushed through the channels with D.I. water. The support was fully dried at 120° C. in an oven overnight. The support was modified by application of skim milk (Great Value™) using a flow-coater illustrated in FIG. 14. The soaking time was 20 seconds. The modified support was dried at ambient conditions for 23 hours. The dried support was mounted into the flow coater again and coated with a 30 wt. % alumina slip AA-3. After dried at 120° C. and fired at 1400° C. for 2 hours, the resulting alumina membrane was characterized by SEM. FIGS. 2a and 2b show SEM images of the channel surface of the bare support and pre-coat layer, respectively. FIG. 2c is a cross-section illustrating a pre-coat thickness of about 40 µm. The mean pore size is approximately 800 nm.

EXAMPLE 2

Deposition of Alpha-alumina Membranes Without the Use of a Pore-Former

Inorganic membrane coatings often encounter problems of mud cracking, de-lamination, and pore closure. Some anti cracking organic materials, such as, PEG, PVP, PVA, etc, are often used in the coating slip. However, in many cases, those additives are not effective.

This example describes deposition of two porous alpha-alumina membranes using a general coating solution formulation comprising different alumina materials. The same alumina monolith support as described in Example 1 was used.

Two 10 wt. % water-based alumina coating solutions were prepared using PEG as an anti-cracking agent and Tiron as a dispersant. The only difference between these two slips lies in the raw alumina materials used. In one coating slip (AA-07), alumina particles of a mean particle size of 0.8-1.1 um from Sumitomo Chemical were used, while the other coating slip (A-16) used alumina of a mean particle size of 0.3-0.4 um from Alcoa Industrial Chemicals. The coating solution AA-07 was prepared as follows. First, 0.13 g Tiron was added into a 150 ml plastic jar containing 100 g D.I. water, followed by adding 26 g alumina AA-07. After the jar was shaken for a while, it was put into an ice bath with ice cover around. Then, an ultrasonic horn was put down into the jar and the ultrasonic treatment was run for 30 times with 10 sec ON and 30 sec OFF. The treated slip was further mixed with 52.78 g D.I. water, 38.89 g 20 wt. % PEG and 2.80 g 1% DCB. After ball-milling for 15-20 h, the slip was poured through a fine screen (opening size of 0.037 mm) into a flask, followed by degassing with a vacuum pump. The coating solution A-16 was prepared using the same procedure.

Figures 3A, 3B:
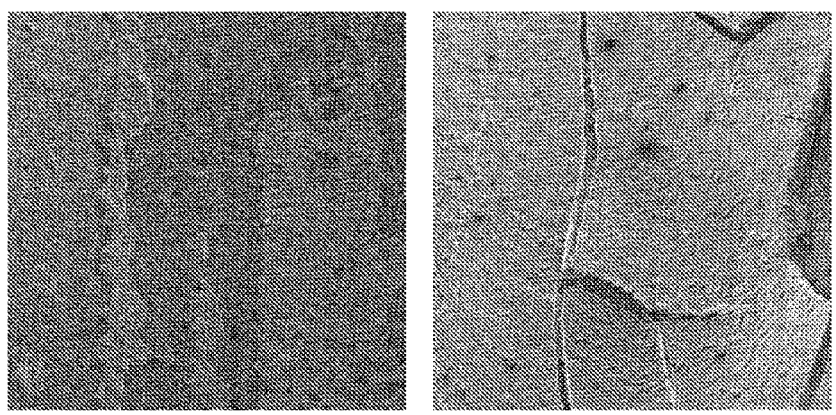
FIGS. 3a and 3b are SEM images of the surface morphology of two alumina coatings, AA-07 (FIG. 3a) and A-16 (FIG. 3b), which were not made using organic pore formers of the invention.

The two alumina coating slips (AA-07 and A-16) were applied on to the pre-coated support (see Example 1) by use of a flow-coater shown in FIG. 14. The same procedure was used for each, which included loading the monolith sample on the coater, introduction of coating slip and soaking, unloading the sample, and spinning the sample to remove the excess coating solution. The soaking time was 20 seconds, and the spinning speed was set at 725 rpm with spinning time of 60 seconds. The same coating process was repeated once in order to reduce defects. Then, the coated sample was dried at 120° C. and fired at 1250° C. with a heating rate of 1° C./min in a flow reactor to remove all the organic and sinter the coating layer. Referring to FIGS. 3a (AA-07) and 3b (A-16), the SEM images show that both membranes have serious problems of cracking and de-lamination, even though anti-cracking agent PEG had been added.

EXAMPLE 3

Deposition of Alpha-alumina Membranes Using Protein from Skim Milk as a Pore Former In addition to cracking and de-lamination problems, another problem encountered with inorganic membrane coatings relates to pore structure. For high flux, uniform pore structures and large porosity is desired. However, in conventional coating processes, pore structures are generally formed from particle packing during drying and firing process, thus limiting porosity.

This example demonstrates feasibility of an alumina membrane coating using skim milk as a pore former. Two water-based coating solutions were made containing 17 wt. % skim milk (Great Value™) having a mean particle size of the skim milk around 0.40 um, which was measured by use of a Nanotrac Particle size analyzer. The two coating slips, AA-07M and A-16M, of the present example were prepared by mixing 100 g of the coating solution, 10 wt % AA-07 and 10 wt % A-16 prepared in Example 2, with 20 g skim milk at ambient condition, respectively.

Figures 4A, 4B:
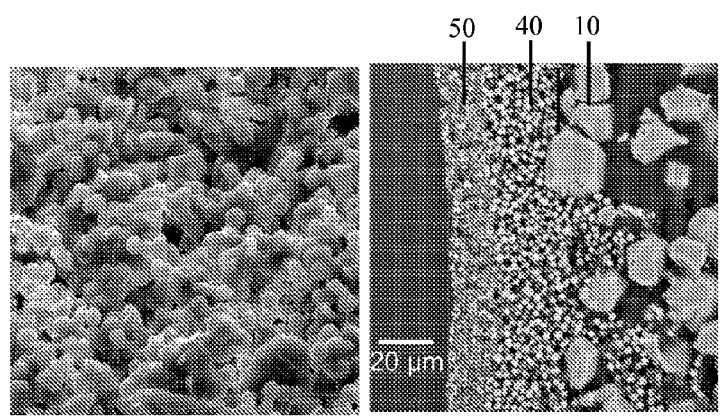
FIG. 4a is a top view SEM image and FIG. 4b is a cross-section SEM image of a porous alumina membrane AA-07, made using skim milk as a pore former, deposited on a pre-coated alumina support.
Figure 5A:
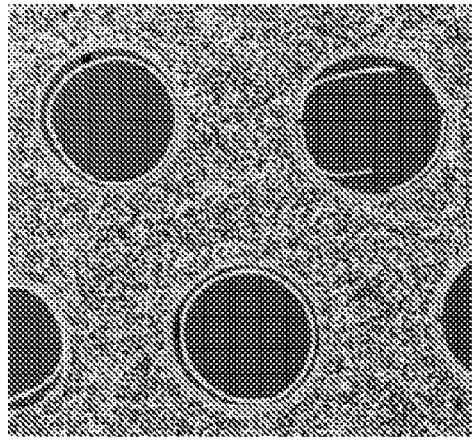
FIGS. 5a and 5b are images comparing porous alpha-alumina membranes prepared from a coating solution without skim milk (FIG. 5a) and with skim milk (FIG. 5b).
Figure 5B:
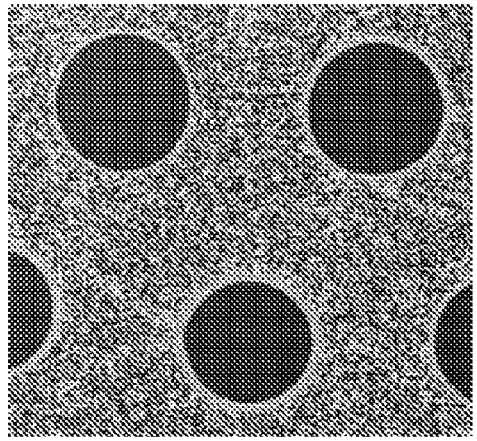
Figure 6A:
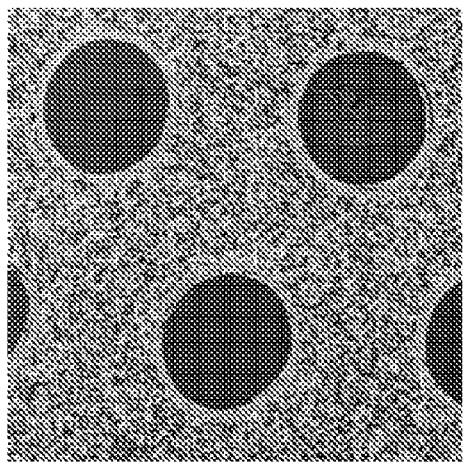
FIGS. 6a and 6b are images comparing porous alpha-alumina membranes prepared from a coating solution without skim milk (FIG. 6a) and with skim milk (FIG. 6b).
Figure 6B:
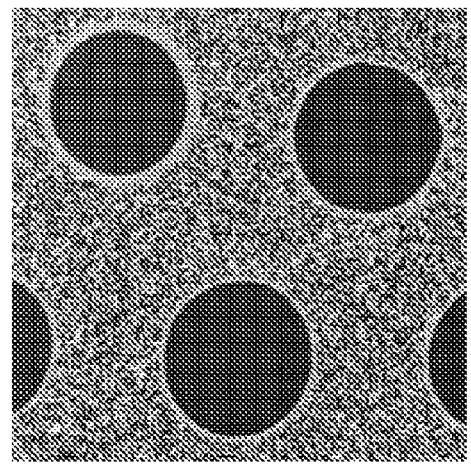

The porous alpha-alumina membrane layer was prepared with the AA-07M or A-16M coating slip by use of the same procedures and parameters as used in Example 2. Scanning electron microscope (SEM) analysis showed that a highly porous alpha-alumina membrane layer was formed on the pre-coated supports, with the SEM analysis for AA-07M shown in the top view of FIG. 4a and the cross-sectional view of 4b. FIG. 4b illustrates the support 10, the pre-coat 40 and the outer membrane layer 50. Another benefit was found that the pore former (skim milk) can be used as an anti-cracking agent and adhesion agent. Referring to FIGS. 5a and 5b, the SEM analysis of the cross-sectional views indicates de-lamination occurred with a coating made without the use of a pore former (FIG. 5a), but did not occur when the pore former was used (FIG. 5b). Similarly, the cracking problems present in the coating made without the use of a pore former as shown in FIG. 6a may be reduced or eliminated by the addition of a pore former as shown in FIG. 6b.

EXAMPLE 4

Deposition of Porous Alpha-alumina Membranes with Graded Pore Structures Without the Use of a Pore Former of the Invention This example describes deposition of two porous alpha-alumina membranes with graded pore structure. A multilayer membrane with graded pore structure has less flow resistance and therefore high flux. The same alumina pre-coat monolith support in Example 1 was used as the support for this coating.

Three 5 wt. % water-based alumina coating solutions used here were prepared using PEG as an anti-cracking agent and Tiron as a dispersant. The only difference of three slips was raw alumina materials. AA-07, A-16, and AKP30 (Sumitomo Chemical) have a mean particle size of 0.8-1.1 um, 0.3-0.4 um, and 0.2-0.3 um, respectively. The 5 wt. % alumina coating solutions were prepared using the same procedure as the following example with the AA-07.

First, 0.06 g Tiron was added into a 150 ml plastic jar containing 100 g D.I. water, followed by adding 12 g alumina AA-07. After the jar was shaken for a while, it was put into an ice bath with ice cover around. Then, an ultrasonic horn was put down into the jar and the ultrasonic treatment was run for 30 times with 10 sec ON and 30 sec OFF. The treated slip was then mixed with 45.3 g D.I. water, 99.13 g 20 wt. % PEG and 3.40 g 1% DCB. After ball-milling for 15-20 h, the slip was poured through a fine screen into a flask, followed by degassing with a vacuum pump.

Two layers of the alumina membrane were prepared using different slips containing gradually smaller particle size. For the membrane AA-07/A-16, a first layer AA-07 was made on the pre-coated support using the slip of 5 wt. % AA-07. The same coating procedure and parameters as in Example 2 was used. After drying at 120° C. and polymer-burn out at 600° C., a second layer A-16 was coated on top of the AA-07 coating using the slip of 5 wt. % A-16 with the same procedure. After drying, the two-layer membrane was fired at 1250° C. for 15 min with a heating rate of 1° C./min. The other membrane AA-07/AKP30 was made by the same way using 5 wt. % AA-07 and 5 wt. % AKP30.

Figure 7:
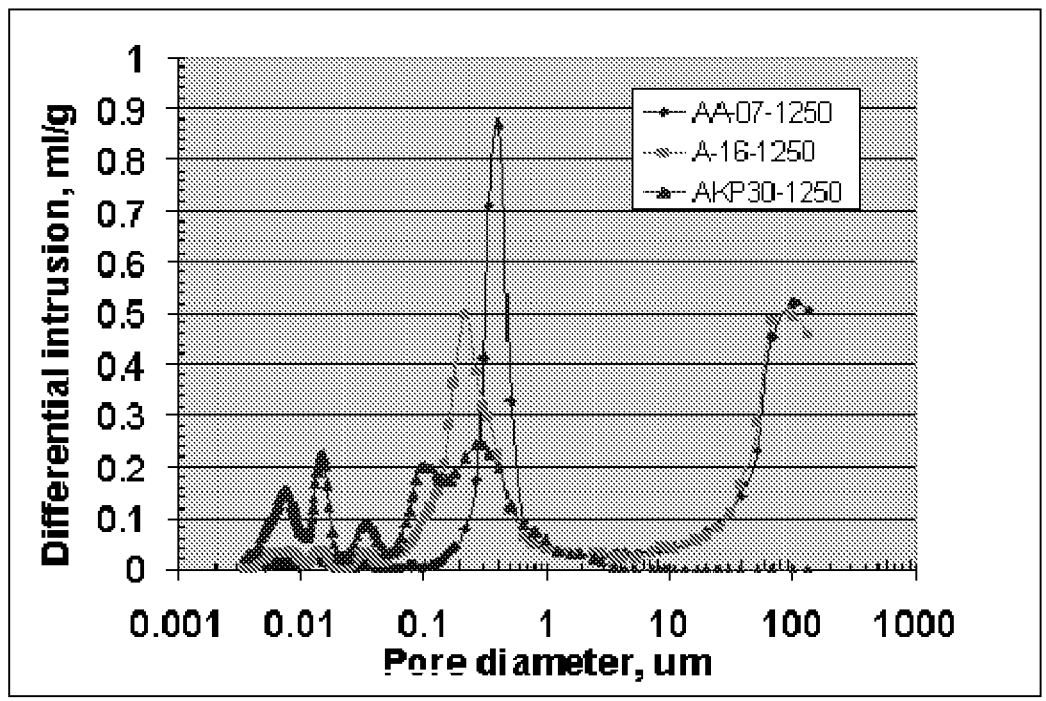
FIG. 7 is a graph illustrating the pore size distributions of three unsupported alumina membranes made of different alumina materials.
Figure 8A:
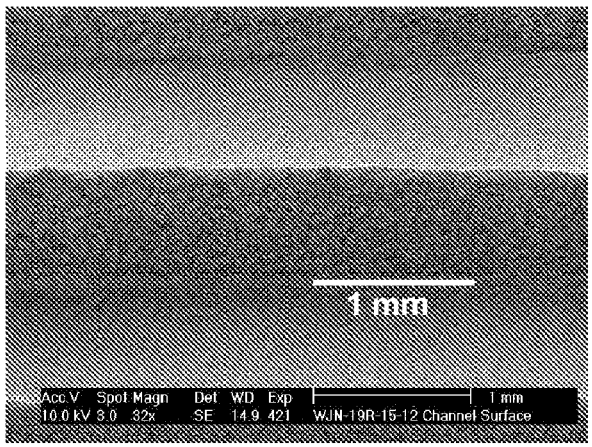
FIGS. 8a and 8b are SEM images of the channel surfaces of alumina membranes AA-07/AKP30 (FIG. 8a) and AA-07/A-16 (FIG. 8b).
Figure 8B:
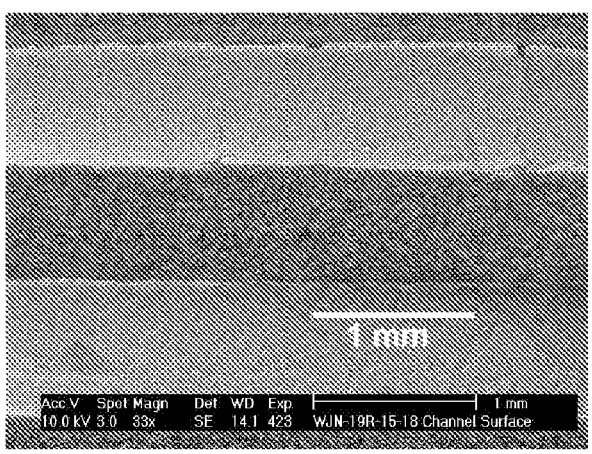

According to the particle dense packing theory, the larger particles form larger pores. The graph of FIG. 7 compares the pore size distributions of the alumina powders prepared from the coating slips AA-07, A-16 and AKP30, by use of the same drying and firing conditions as the membrane formation. The membrane coating slips AA-07 and A-16 have narrow single mode pore size distribution with a peak pore size of 420 and 220 nm, respectively. The membrane slip AKP30 has a wide pore size distribution with several peaks at 14, 100, 270 nm. SEM images show that the membrane AA-07/AKP30 has no visible crack, while AA-07/A-16 has some cracks and penetration, as shown in FIGS. 8a and 8b, respectively.

EXAMPLE 5

Deposition of Alpha-alumina Membrane Using Protein Particles from Skim Milk as Pore Former This example describes another deposition of multi-layer alpha-alumina membrane using skim milk as a pore former. Two water-based alumina coating solutions used here were 5 wt. % AA-07 and 5 wt. % AKP30M. The preparation procedure for the slip AA-07 was the same as in Example 4. The slip AKP30M contained 17 wt. % skim milk, which serves as a pore former. The same skim milk as in Example 3 was used. The coating slip AKP30M was made by mixing 100 g coating solution having 5 wt. % AKP30 (in Example 4) with 20 g skim milk at ambient conditions. The alumina membrane AA-07/AKP30M was prepared by sequential coating of the monolith substrate with the AA07 and AKP30M coating slip, as described in Example 4. The resulting two-layer membrane coating was fired at 1150° C. for 2 hours.

Figure 9:
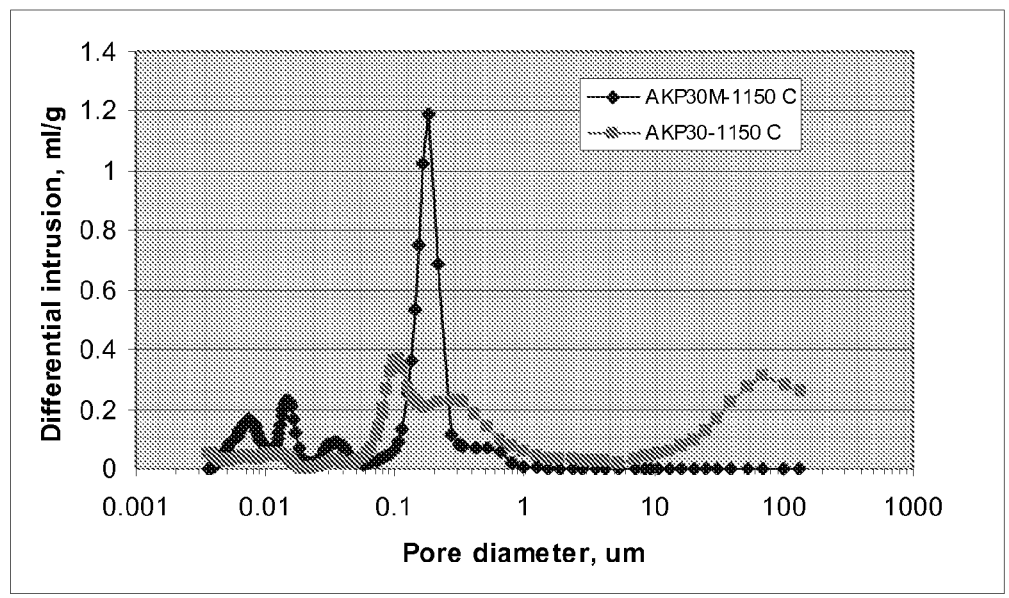
FIG. 9 is a graph illustrating pore size distributions of alumina membranes AKP30 (made without pore former) and AKP30M (made with pore former).
Figure 10A:
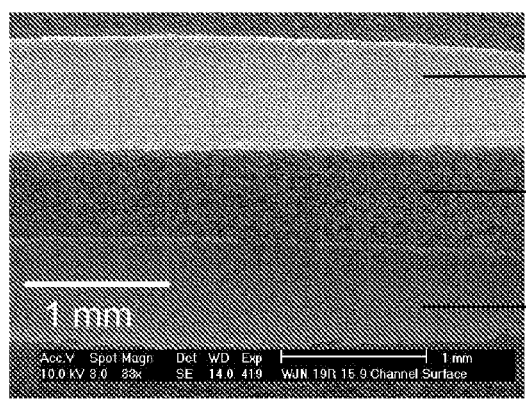
FIGS. 10a and 10b are SEM images of channel surfaces coated with an AA-07/AKP30M alumina coating.
Figure 10B:
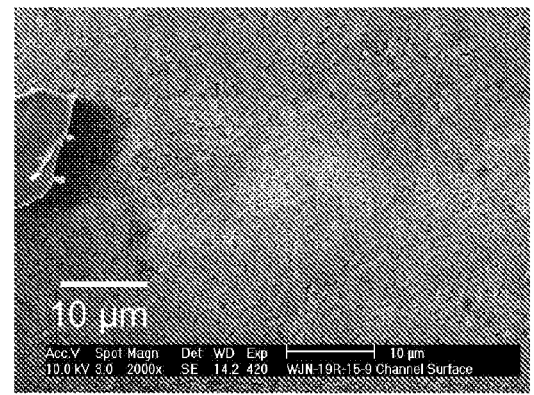
Figures 11A, 11B:
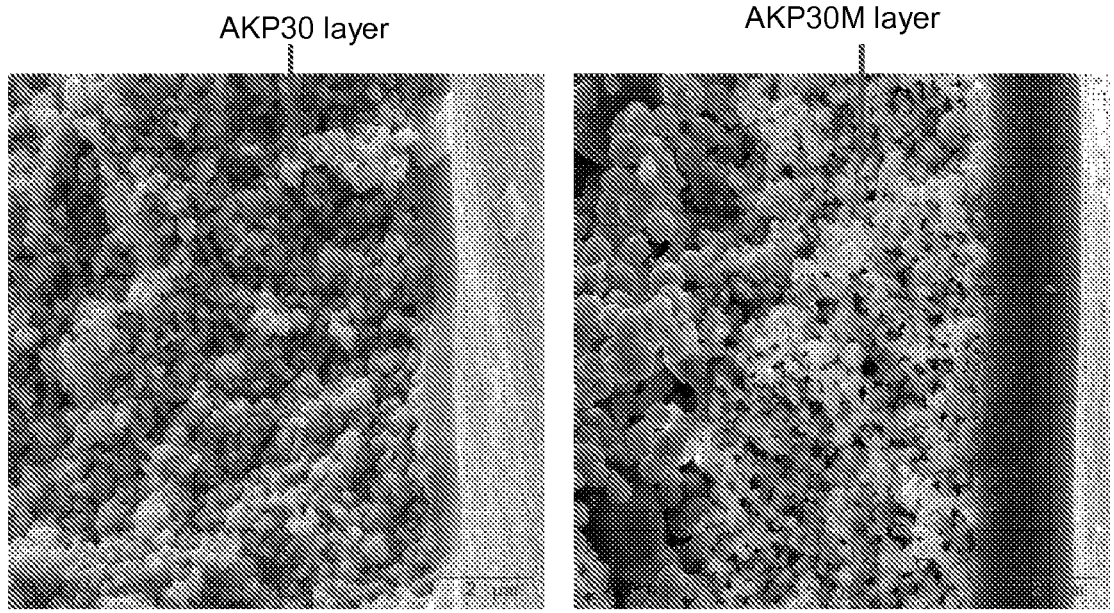
FIGS. 11a and 11b are SEM images of cross-sectional views of AKP30 and AKP30M coatings as underlying layers for a gamma-alumina coating of finer pores.

The graph of FIG. 9 shows the effect of pore former on pore size distribution of the resulting porous alumina structure. As shown, the addition of the pore former makes the pore size narrower. FIGS. 10a and 10b, using different magnifications, show a uniform, crack-free surface of the resulting AA-07/AKP30M membrane structure. FIG. 10a illustrates two channel surfaces 60 and porous wall 62. FIG. 10b illustrates a higher magnification of one of the channel surfaces 60. FIGS. 11a and 11b show the use of the AKP30 and AKP30M coatings as an underlying layer for a gamma-alumina membrane coating having finer pores, such as for a gas-separation application. As shown, the AKP30M coating layer appears more porous than the AKP30 coating structure.

EXAMPLE 6

Permeability and Filtration Testing of Membrane Coatings

Figure 12:
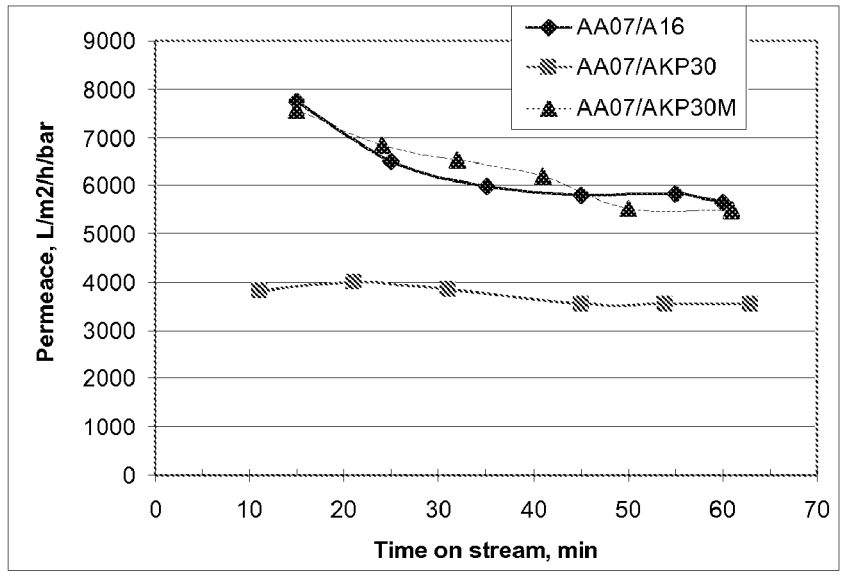
FIG. 12 is a graph illustrating the pure water permeability of different membrane coatings at room temperature.

The permeability of the membrane coatings prepared in above Examples 4 and 5 was measured with de-ionized water on a laboratory-scale filtration testing apparatus. The water flows through the membrane channel at a linear velocity of about 170 cm/s. A pressure gradient of approximately 25 psi was maintained between the flow channel and exterior of the monolith membrane body. Under such a pressure driving force, the water flows across the membrane coating layer from the channel, permeates through the porous support matrix, and comes out at the exterior of the monolith body. FIG. 12 shows permeance of the water through three different membrane structures, AA-07/A-16, AA-07/AKP30, and AA-07/AKP30M. The permeance measures permeability of the membrane structure and is calculated from the following equation:

$$P = \frac{V_P}{SA_M \cdot TMP}$$

where P=permeance, L/m$^2$/h/bar; $V_P$=water permeation flow rate out of the testing membrane sample, L/h; $SA_M$=membrane surface area in all the channels that are exposed to the permeation fluid, m$^2$; and TMP=trans-membrane pressure, bar.

FIG. 12 shows that the AA-07/A-16 and AA-07/AKP30M membrane structure has substantially higher permeability than the AA07/AKP30. The higher permeability of the AA-07/A16 than the AA-07/AKP30 is expected, since the A-16 coating layer has much larger pore sizes than the AKP30 layer, and even has some cracks. The higher permeability of the AA-07/AKP30M than the AA-07/AKP30 demonstrates a permeability advantage of the present invention through use of the skim milk pore former over AKP30.

Figure 13:
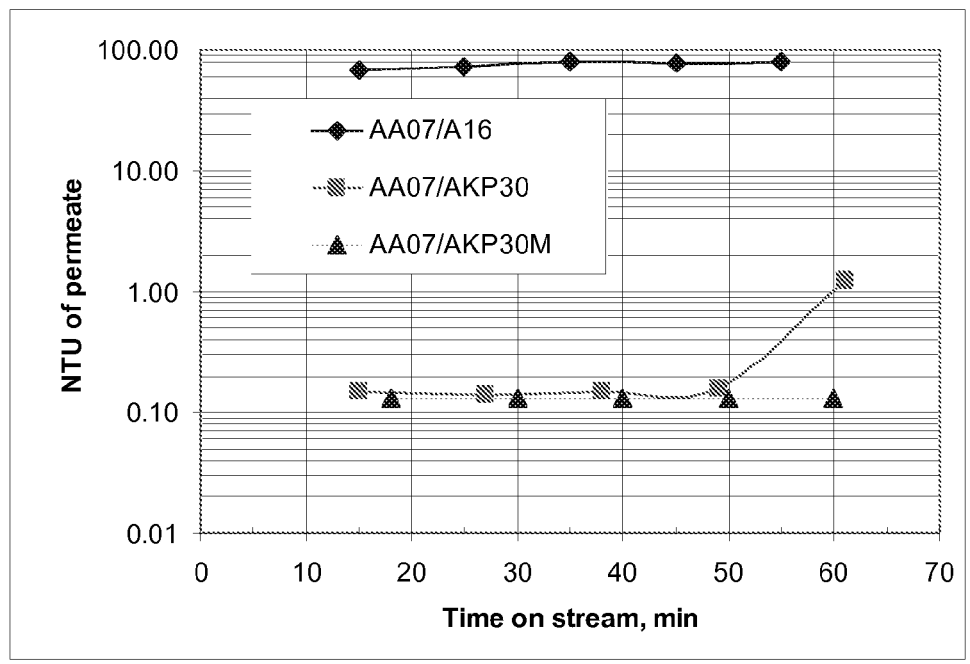
FIG. 13 is a graph illustrating filtration efficiency of different membrane coatings at room temperature.

Permeability is one characteristic of the membrane structure. Another property of the membrane structure is filtration function. The filtration efficiency was characterized by conduct cross-flow filtration with a polyacrylate/water mixture. The mixture contains polyacrylate particles of size ranging from approximately 100 to approximately 500 nm. The mixture looks cloudy and has a turbidity unit number (nephelometric turbidity unit, NTU) of approximately 600. The filtration test was conducted in a similar manner to the permeability testing. Under a drive force of trans-membrane pressure, the water flows across the membrane and permeates out of the monolith support body, while the particles are blocked by the membrane coating. The permeate was collected and measured for NTU number. Clarity of the permeate is a direct indication to the filtration efficiency of the membrane structure. The graph of FIG. 13 plots the variation of NTU of the permeate against the time on stream. The NTU numbers for the permeate of the AA-07/A-16 membrane structure equals about 80, which indicates lesser filtration efficiency consistent with the large pore size and cracks of the AA-07/A-16 membrane coating. By contrast, NTU numbers for the permeate from the AA-07/AKP30M and the AA-07/AKP30 are all low, <0.5, which indicates an excellent filtration performance. Comparing FIG. 13 to FIG. 12, the membrane structure AA-07/AKP30M prepared from the present invention shows similar or slightly better filtration efficiency than the AA07/AKP30 and substantially higher permeability.

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

Furthermore, as used herein, in describing and claiming the present invention, the use of the indefinite article "a" or "an" includes one or more of the recited elements and should not be limited to "only one" unless explicitly indicated to the contrary.

Also as used herein, a "wt %" or "weight percent" or "percent by weight" of a component, unless specifically stated to the contrary, is based on the total weight of the composition or article in which the component is included.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

We claim:

1. A method for preparing a porous inorganic coating on a porous support, which comprises:
   providing a porous support comprising a first end, a second end, and a plurality of inner channels having surfaces defined by porous walls and extending through the support from the first end to the second end;
   applying to the inner channel surfaces of the support a coating comprising inorganic particles and an organic pore-forming material selected from protein particles, starch particles, synthetic polymer particles, and combinations thereof; and
   heating the coated support to remove the organic pore-forming material, leaving the porous inorganic coating on the porous support.

2. The method of claim 1, wherein the provided porous support is in the form of a honeycomb monolith.

3. The method of claim 1, wherein the provided porous support is inorganic.

4. The method of claim 3, wherein the provided porous inorganic support is ceramic, wherein the inner channels have surfaces defined by porous walls of the porous ceramic support.

5. The method of claim 1, wherein the inner channels of the provided porous support pre-coated by a porous coating of inorganic particles.

6. The method of claim 5, wherein the inorganic particles are alpha-alumina particles.

7. The method of claim 5, wherein the provided porous support comprises a porous ceramic support coated with the porous coating of inorganic particles.

8. The method of claim 1, wherein the porous support comprises a ceramic selected from cordierite, alpha-alumina, mullite, aluminum titivate, titania, zirconia, ceria, and combinations thereof.

9. The method of claim 1, wherein the inner channels of the provided support are circular and have an average diameter of from 0.5 to 2 mm.

10. The method of claim 1, wherein the pores of the porous walls of the provided support have a median pore size of from 0.5 to 10 μm.

11. The method of claim 1, wherein the organic pore-forming material comprises protein particles.

12. The method of claim 11, which comprises contacting the inner channel surfaces of the support with a composition comprising an aqueous suspension of protein particles to apply the protein particles.

13. The method of claim 12, wherein the aqueous suspension of protein particles is skim milk.

14. The method of claim 1, wherein the organic pore-forming material comprises synthetic polymer particles.

15. The method of claim 14, wherein the synthetic polymer particles comprise polystyrene, polyacrylate, an oligomer, or combinations thereof.

16. The method of claim 1, wherein the organic pore-forming material comprises particles having a median particle size of from 0.02 to 3 μm.

17. The method of claim 1, which comprises applying the coating comprising inorganic particles and the organic pore-forming material to the inner channel surfaces of the support by dip coating, flow coating, slip casting, immersion, or combinations thereof.

18. The method of claim 1, wherein the coating comprising inorganic particles and the organic pore-forming material wherein the coating comprises cordierite, alumina, mullite, aluminum titinate, titania, zirconia, or ceria particles or combinations thereof.

19. The method of claim 1, wherein the coating comprising inorganic particles and the organic pore-forming material wherein the coating comprises inorganic particles having a median particle size of from 0.02 to 10 μm.

20. The method of claim 1, wherein the coating comprising inorganic particles and the organic pore-forming material is applied from a coating composition that further comprises a dispersant, a binder, an anti-cracking agent, an anti-foam agent, or combinations thereof.

21. The method of claim 1, which comprising firing the coated support to calcinate the organic pore-forming material, leaving the porous inorganic coating on the porous support.

22. A method for preparing a porous inorganic coating on a porous support, which comprises:
   providing a porous support comprising a first end. a second end, and a plurality of inner channels having surfaces defined by porous walls and extending through the support from the first end to the second end;

applying to the inner channel surfaces of the support a coating comprising inorganic particles and an organic pore-forming material selected from protein particles, starch particles, synthetic polymer particles, and combinations thereof;

heating the coated support to remove the organic pore-forming material, leaving the porous inorganic coating on the porous support and sintering the inorganic particles in the porous inorganic coating.

23. The method of claim 22, wherein the sintered porous inorganic coating has a thickness of from 0.2 to 25 μm throughout the length of the inner channels.

24. The method of claim 23, wherein the inner channels have a length of 80 mm or more.

25. The method of claim 22, wherein the sintered porous inorganic coating has a median pore size of from 0.01 to 2 μm.

26. The method of claim 22, wherein the organic pore-forming material is selected from protein particles, starch particles, or a combination thereof.

* * * * *